United States Patent
Assaderaghi et al.

(10) Patent No.: US 11,586,860 B2
(45) Date of Patent: Feb. 21, 2023

(54) METHOD FOR PREVENTING THE EXTRACTION OF A MACHINE LEARNING MODEL

(71) Applicant: NXP B.V., Eindhoven (NL)

(72) Inventors: Fariborz Assaderaghi, Emerald Hills, CA (US); Marc Joye, Palo Alto, CA (US)

(73) Assignee: NXP B.V., Eindhoven (NL)

(*) Notice: Subject to any disclaimer, the term of this patent is extended or adjusted under 35 U.S.C. 154(b) by 1156 days.

(21) Appl. No.: 16/168,868

(22) Filed: Oct. 24, 2018

(65) Prior Publication Data
US 2020/0134391 A1    Apr. 30, 2020

(51) Int. Cl.
G06N 20/00    (2019.01)
G06K 9/62     (2022.01)
G06N 3/08     (2023.01)
G06N 5/04     (2023.01)

(52) U.S. Cl.
CPC ............ *G06K 9/6269* (2013.01); *G06N 3/08* (2013.01); *G06N 5/04* (2013.01); *G06N 20/00* (2019.01)

(58) Field of Classification Search
None
See application file for complete search history.

(56) References Cited

PUBLICATIONS

Vaughan, A Novel Machine Learning Classifier Based on a Qualia Modeling Agent (QMA), Doctoral Thesis, Air Force Institute of Technology, 2016, pp. 1-205 (Year: 2016).*

Saarinen, Adaptive Real-Time Anomaly Detection for Multi-Dimensional Streaming Data, Master's Thesis, Aalto University, 2017, pp. 1-91 (Year: 2017).*

Ateniese, Giuseppe, et al.; "Hacking Smart Machines With Smarter Ones: How to Extract Meaningful Data From Machine Learning Classifiers;" International Journal of Security and Networks, 10(3):137-150, 2015. doi:10.1504/IJSN.2015.071829.

Correia-Silva, Jacson Rodrigues, et al.; "Copycat CNN: Stealing Knowledge by Persuading Confession With Random Non-Labeled Data;" 2018 International Joint Conference on Neural Networks (IJCNN), Rio de Janeiro, Brazil, Jul. 8-13, 2018.

U.S. Appl. No. 16/040,992; Inventor Wilhelmus Petrus Adrianus Johannus Michiels, et al.; "Method for Making a Machine Learning Model More Difficult to Copy;" filed Jul. 20, 2018.

(Continued)

*Primary Examiner* — Wilbert L Starks
(74) *Attorney, Agent, or Firm* — Daniel D. Hill (57) ABSTRACT

A method and data processing system for detecting tampering of a machine learning model is provided. The method includes training a machine learning model. During a training operating period, a plurality of input values is provided to the machine learning model. In response to a predetermined invalid input value, the machine learning model is trained that a predetermined output value will be expected. The model is verified that it has not been tampered with by inputting the predetermined invalid input value during an inference operating period. If the expected output value is provided by the machine learning model in response to the predetermined input value, then the machine learning model has not been tampered with. If the expected output value is not provided, then the machine learning model has been tampered with. The method may be implemented using the data processing system.

12 Claims, 4 Drawing Sheets

(56) References Cited

PUBLICATIONS

Fredrikson, Matt, et al.; "Model Inversion Attacks That Exploit Confidence Information and Basic Countermeasures;" 22nd ACM SIGSAC Conference on Computer and Communications Security; pp. 1322-1333, Denver, CO, USA, Oct. 12-16, 2015. ACM. doi:10.1145/2810103.2813677.

Juuti, Mika, et al.; "PRADA: Protecting Against DNN Model Stealing Attacks;" eprint arXiv:1805.02628, May 2018. URL https://arxiv.org/abs/1805.02628.

Kesarwani, Manish, et al.; "Model Extraction Warning in MLaaS Paradigm;" eprint arXiv:1711.07221, Nov. 2017. URL https://arxiv.org/abs/1711.07221.

Mcdaniel, Patrick, et al.; "Machine Learning in Adversarial Settings;" IEEE Security & Privacy Magazine, 14(3):68-72, May/Jun. 2016. doi:10.1109/MSP.2016.51.

Oh, Seong Joon, et al.; "Towards Reverse Engineering Black-Box Neural Networks;" 6th International Conference on Learning Representations (ICLR); Vancouver, Canada, Apr. 30-May 3, 2018. Poster Session.

Papernot, Nicolas, et al.; "Practical Black-Box Attacks Against Machine Learning;" 2017 ACM on Asia Conference on Computer and Communications Security (AsiaCCS), pp. 506-519, Abu Dhabi, United Arab Emirates, Apr. 2-6, 2017. ACM. doi:10.1145/3052973.3053009.

Schölkopf, Bernhard, et al.; "Estimating the Support of a High-Dimensional Distribution;" Neural Computation, 13(7):1443-1471, Jul. 2001.

Shi, Yi, et al.; "How to Steal a Machine Learning Classifier With Deep Learning;" 2017 IEEE International Symposium on Technologies for Homeland Security (THS), pp. 1-5, Waltham, MA, USA, Apr. 25-26, 2017. IEEE. doi:10.1109/THS.2017.7943475.

Tramèr, Florian, et al.; "Stealing Machine Learning Models via Prediction APIs;" 25th USENIX Security Symposium, pp. 601-618, Austin, TX, USA, Aug. 10-12, 2016. USENIX Association. URL https://www.usenix.org/conference/usenixsecurity16/technical-sessions/presentation/tramer.

\* cited by examiner

METHOD FOR PREVENTING THE EXTRACTION OF A MACHINE LEARNING MODEL

BACKGROUND

Field

This disclosure relates generally to machine learning, and more particularly, to a method for preventing the extraction of a machine learning model.

Related Art

Machine learning is becoming more widely used in many of today's applications, such as applications involving forecasting and classification. Generally, a machine learning model is trained, at least partly, before it is used. Training data is used for training a machine learning model. Machine learning models may be classified by how they are trained. Supervised learning, unsupervised learning, semi-supervised learning, and reinforcement learning are examples of training techniques. The effectiveness of the machine learning model is influenced by its accuracy, execution time, storage requirements, and the quality of the training data. The expertise, time, and expense required for compiling a representative training set of data, labelling the data results in the training data, and the machine learning model obtained from the training data are valuable assets.

Protecting a machine learning model from attacks has become a problem. When machine learning is provided as a service, a user only has access to the inputs and outputs of the model. Model extraction is an attack that results in a near identical copy of the machine learning model being produced. To extract the model when the machine learning model is provided as a service, valid queries are provided to the model and the resulting output is compiled. Even when an attacker is just given access to the inputs and outputs, the machine learning model can be relatively easily copied. Once an attacker has copied the model, it can be illegitimately used and monetized. Also, an adversary can apply model extraction to gain white-box access and thereby develop other attacks, such as attacks that can fool the original model to mis-predict.

Therefore, a need exists for a way to detect and prevent the extraction of a machine learning model.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for preventing extraction of a machine learning model. In one embodiment, the method includes adding additional training data to a normal training dataset for training the machine learning model. The additional training data is for determining if an input sample, input during inference operation, has a predetermined property. If the input sample has the predetermined property, then the input sample is determined to be a valid and legitimate sample, and an output is computed from the input sample. However, if the input sample does not have the predetermined property, then the input sample may be an input sample that was input by an attacker for the purpose of extracting the model. In one embodiment, the predetermined property is if the input sample is within a predetermined distribution of input samples. If the input sample does not have the predetermined property, an output is not computed from the input sample and provided by the model. Instead, a notification may be provided so that measures can be taken to prevent the attempted model extraction. In another embodiment, the method may include determining if an input sample is within a predetermined distribution using the same training data set used for prediction.

By training the machine learning model with the additional training data, attacks designed to extract the model can be detected, and steps to prevent the extraction can be initiated.

In accordance with an embodiment, there is provided, a method including: during a training phase of operation, training a machine learning model using first training data having a first classification; during the training phase of operation, training the machine learning model using second training data having a second classification, the second classification being different than the first classification; determining, during an inference phase of operation of the machine learning model, if an input sample belongs to the first classification or to the second classification; if the input sample is determined to belong to the second classification, the machine learning model outputting a notification; and if the input sample is determined to belong to the first classification, the machine learning model predicting a property of the input sample. The input sample may belong to the first classification if the input sample has a predetermined property, and the input sample may belong to the second classification if the input sample lacks the predetermined property. The second classification may be an inlier/outlier classification. The machine learning model may be characterized as being an ensemble of machine learning models, and may further include a first machine learning model and a second machine learning model, and wherein determining if an input sample belongs in the first classification or the second classification may further include: during the training phase, training the first machine learning model using the first training data; during the training phase, training the second machine learning model using the second training data, wherein the second classification is an inlier/outlier classification; during the inference phase, providing the input sample to the second machine learning model, if the input sample is determined to be an outlier, providing a notification, and if the input sample is determined to be an inlier, providing the input sample for further computation by the first machine learning model. The method may further include providing a confidence level with the inlier/outlier determination. The notification may include one of a randomly generated output value or an error notification. The first training data may be characterized as being normal training data for training the machine learning model to perform a first task, and wherein the second training data may be characterized as being abnormal training data that is for training the machine learning model to perform a second task, the second task being unrelated to the first task. The machine learning model may be provided as a service and stored remotely from a user.

In another embodiment, there is provided, a method for protecting a machine learning model from extraction, the method including: during a training phase of operation, training the machine learning model using normal training data, the normal training data for training the machine learning model to perform a predetermined task; during the training phase of operation, training the machine learning model using abnormal training data, the abnormal training data for training the machine learning model to identify an attempted extraction of the machine learning model; determining, during an inference phase of operation of the machine learning model, if an input sample is input to extract the machine learning model or if the input sample is input for performance of the predetermined task; if the input sample is determined by the model to be the attempted extraction, the machine learning model outputting a notification, and if the input sample is determined by the model to be related to the predetermined task, the machine learning model predicting a property of the input sample. Determining if the input sample was input to extract the machine learning model may further comprise determining if the input sample is within a predetermined distribution, and wherein if the input sample is outside of the predetermined distribution, the notification is output. The machine learning model may be characterized as being an ensemble of machine learning models and may further include a first machine learning model and a second machine learning model, the method may further include: during the training phase of operation, training the first machine learning model using the normal training data and training the second machine learning model using the abnormal training data; during the inference phase, providing the input sample to the second machine learning model, if the input sample is determined to be within a predetermined distribution, providing the input sample for further computation by the first machine learning model, and if the input sample is outside the predetermined distribution, providing a notification. The method may further include providing a confidence level with the notification. The notification may include one of a randomly generated output value or an error notification. The machine learning model may be provided as a service and stored remotely from a user.

In another embodiment, there is provided, a method including: providing a machine learning system having a first machine learning model and a second machine learning model, during a training phase of operation of the machine learning system, training the first machine learning model using normal training data, the normal training data for training the machine learning model to perform a predetermined task; during the training phase of operation, training the second machine learning model using abnormal training data, the abnormal training data for training the machine learning model to identify an attempted extraction of the machine learning model; determining, during an inference phase of operation of the machine learning system, if an input sample inputted to the second machine learning model is inputted to extract the first machine learning model or if the input sample is inputted for performance of the predetermined task; if the input sample is determined by the model to be inputted for the attempted extraction, the machine learning model outputting a notification, and if the input sample is determined by the model to be related to the predetermined task, the machine learning model predicting a property of the input sample. Determining if the input sample was inputted to attempt extraction of the first machine learning model may further include determining if the input sample is inside or outside of a predetermined distribution, and wherein if the input sample is determined to be outside of the predetermined distribution, the notification is output. The method may further include providing a confidence level with the notification. The notification may include one of a randomly generated output value or an error notification. The machine learning model may be provided as a service and stored remotely from a user. The second machine learning model may be characterized as being a neural network having a softmax activation function.

Various types of machine learning algorithms are used in machine learning models, such as prediction algorithms and classification algorithms. Machine learning models learn a function which correctly maps a given input value to an output value using training data. After training, the learned function can then be used to infer output values corresponding to new inputs. During inference operation, a machine learning model receives an input sample that can be viewed as a vector. The components of the vector represent features of the input sample. Each sample is represented by a feature vector of a given dimension and each component of this vector is expected to be in a certain range and of a given type, e.g. an integer, 32-it floating point, etc. An input sample satisfying these requirements can be termed a "valid" sample. Otherwise, the input sample is termed "invalid."

Training data is available from various sources. For example, the MNIST training dataset, is a subset of a larger database provided by the National Institute of Standards and Technology (NIST). The MNIST includes 70,000 black and white images of handwritten digits, each represented by a 28×28 pixel bounding box (viewed as an array of size 784), where each pixel is encoded by a byte representing the corresponding gray level (i.e., an integer in the range of 0 to 255. A valid sample can be represented by a vector with 28×28=784 features, where each feature is an integer in the range of 0 to 255.

The Pima Indians Diabetes training dataset is provided by the UCI Machine Learning Repository via Kaggles Kernels. The Pima Indians Diabetes is a binary classification dataset used to predict whether a female age 21 or greater has diabetes based on 8 features. The output classes of a model trained with the dataset are "diabetes" or "no diabetes." The dataset has 768 entries. The features are (1) number of times pregnant, (2) plasma glucose concentration, (3) blood pressure, (4) triceps skin fold thickness, (5) 2-hour serum insulin, (6) body mass index (BMI), (7) diabetes pedigree function, and (8) age. Each of the 8 features respectively lies in a certain range and has a given type. For example, in the dataset, the number of pregnancies is encoded as an integer in the range of 0 to 17, and the BMI ($kg/m^2$) is provided as a ratio between 19.1 and 67.1 encoded with 2 digits for the integral part and 1 digit for the decimal part, etc.

The input samples of a given dataset of training data follow a certain distribution. The different features may be inter-correlated and present hidden relationships between them. The actual purpose of a machine learning algorithm is to uncover these hidden relationships, or patterns. As such, not every feature vector satisfying the range and type conditions correspond to a real sample. A valid sample that follows the certain distribution of the dataset will be called "normal." Normal training data is used to train a model to perform a predetermined task, such as the above described training datasets. Otherwise, a valid sample will be called "abnormal." Abnormal training data is training data that may be provided to the same machine learning model as the normal training data, but the abnormal training data is unrelated to the normal training data and is not useful for training the model to perform the predetermined task. So, in the MNIST dataset mentioned above, a normal sample is a 28×28 grey-scale image with 256 possible levels of gray and representing a decimal digit. An abnormal sample may also be a 28×28 grey-scale image with 256 possible levels of gray, but the image represents something besides a decimal digit.

The distinction between normal and abnormal input samples is relevant with respect to machine learning model extraction attacks. Machine learning as a service (MLaaS) is generally part of a cloud-based computing service provided for a fee. In the case of MLaaS, users only have access to the input and output samples that are provided to and received from the machine learning model. Users of the service generally submit "normal" samples for characterization for a variety of applications such as image recognition (e.g., an image of a digit), language processing, medical analysis, etc. However, an adversary who is attempting to extract the model may provide input samples that may be "abnormal" because "normal" samples are not available or may be difficult to obtain. If the adversary only has access to limited legitimate normal data, the limited normal data may be supplemented with abnormal data to create a large enough training data set. The adversary will then try to reconstruct the model from the samples and the corresponding returned outputs.

In the case where the only access available to the model is to the model's inputs and outputs, the limited access may be available because the machine learning model is being provided as a service, or the model may be implemented in a black box. A goal of model extraction, or model cloning, when only the inputs and outputs are available, is to extract the functionality of the machine learning model as accurately as possible by providing valid queries, that can be abnormal queries, to the machine learning model and storing the returned outputs. The input/output pairs of data can be used to train another machine learning model which in terms of functionality is close to the original model. Without knowledge of the selected input values, it is unlikely that an adversary, or attacker, will input exactly the same queries used to train the original model. However, it is possible a functionally equivalent model can be trained using training data that is not normal, e.g., a 28×28 image that is not a number. The illustrated embodiments provide a method for detecting such an attack by, for example, training and enabling the model to distinguish normal input data from abnormal input data.

Figure 1:
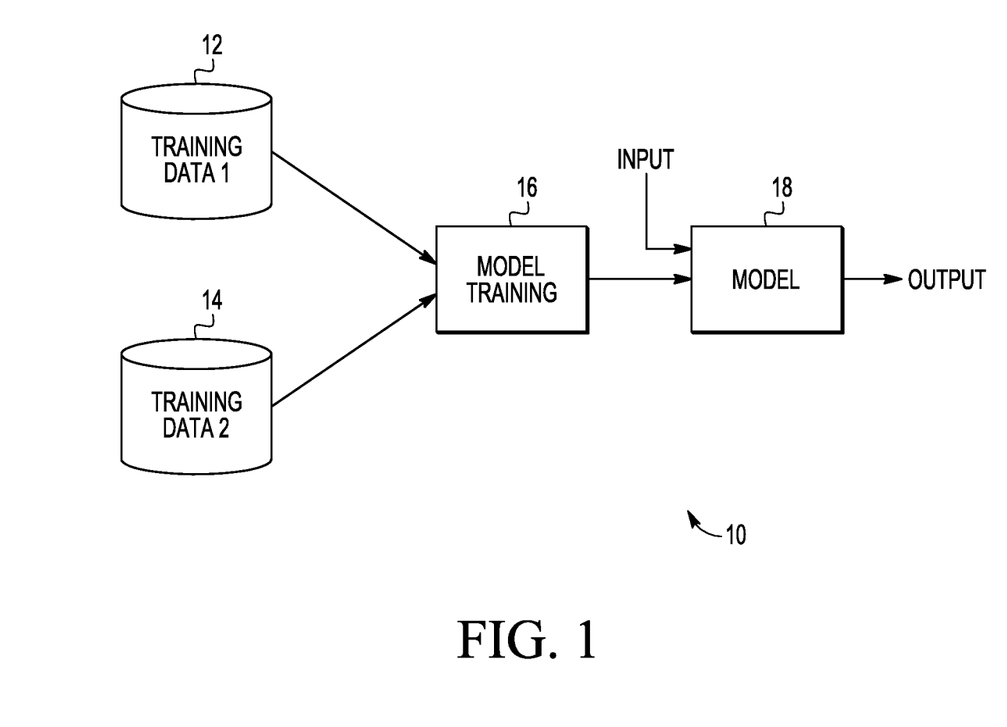
FIG. 1 illustrates a conceptual machine learning system in accordance with an embodiment.

FIG. 1 illustrates machine learning system 10 in accordance with an embodiment. Machine learning system 10 includes training data 12 and 14, model training block 16, and machine learning model 18. Machine learning system 10 is provided with two different types of training data. Training data 12 is valid normal training data used to train the machine learning model to perform a task, such as image classification or medical diagnosis. Training data 14 is abnormal training data that is also valid training data but is not useful for training model 18 to perform the task. Machine learning model 18 is a MLaaS model, or implemented in a black box, where only inputs and outputs of the model are available to an attacker. Machine learning system 10 treats abnormal training data 14 as additional data so that the model is trained with data having a different classification, wherein the different classification is to predict if an input sample is an abnormal input sample that may be provided to the machine learning model for the purpose of extracting the model. In the illustrated embodiment, the abnormal training data 14 may include a collection of a variety of input samples that are outside of the classification of training data 12. After training with normal training data 12 and abnormal training data 14, model 18 is ready for inference operation. A model that is trained with data having an additional class of data is known as a multi-output model. During inference operation, in response to receiving a valid input (INPUT) from a user, the machine learning model 18 provides one or more outputs based on the predicted classification of the input. When the model predicts the output corresponds to normal data, then the output (OUTPUT) is provided predicting the result corresponding to the input (e.g., handwritten digit class for the MNIST dataset). However, if an input that is provided to model 18 during inference operation is valid but abnormal, then the output is a notification of an attempted extraction attack.

Figure 2:
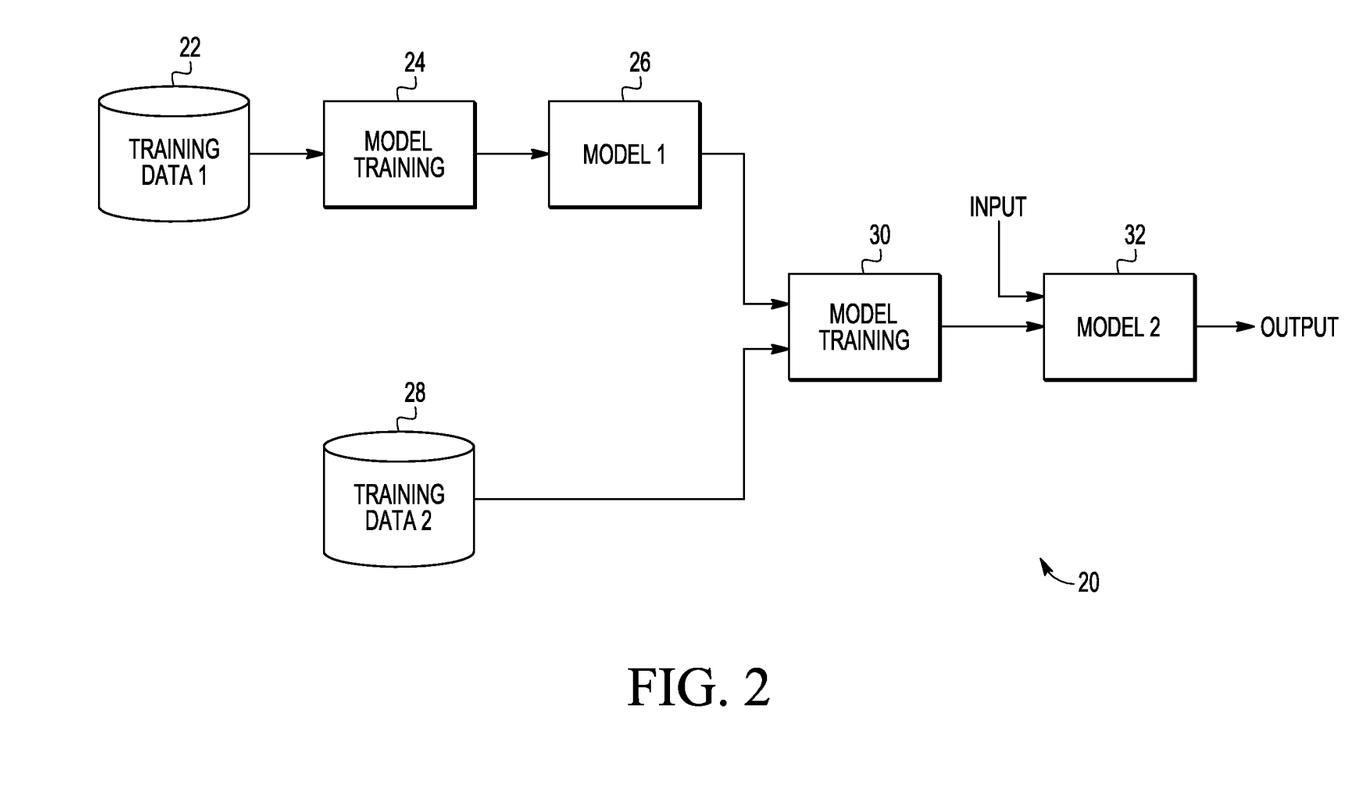
FIG. 2 illustrates a conceptual machine learning system in accordance with another embodiment.

FIG. 2 illustrates a conceptual machine learning system 20 in accordance with another embodiment. Machine learning system 20 includes training data 22 and 28, model training blocks 26 and 30, partially trained model 26, and trained machine learning model 32. Machine learning model 32 is a MLaaS model, or implemented in a black box, where only inputs and outputs of the model are available to an attacker. As described regarding the embodiment of FIG. 1, machine learning system 20 is provided with training data having two different classifications. Training data 22 is normal training data used to train the machine learning model to perform a task, such as image classification or medical diagnosis. Training data 28 is abnormal training data as defined above. First, model 26 is trained using normal training data 22 and model training block 24 to produce intermediate machine learning model 26 during model training operating phase of machine learning system 20. Machine learning model 32 is then trained with abnormal training data 28 using model training block 30 to produce a multi-output machine learning model 32. Note that training with normal and abnormal training data in FIG. 2 can be reversed. During inference operation, in response to trained model 32 receiving a valid input (INPUT), the model provides one or more outputs based on the predicted classification of the input data. Additionally, the model may provide a notification output if a model extraction attempt is predicted. When the model predicts the output is corresponds to normal data, the normal training data, then the output is provided predicting the result corresponding to the input (e.g., handwritten digit class for the MNIST dataset). When the model predicts the output corresponds to abnormal data, then model 32 outputs a notification of an attempted attack.

In addition to providing the class, i.e. normal or abnormal, a corresponding confidence level may also be output. For example, a softmax activation function in a neural network may be used to provide a confidence level to refine the class prediction between the normal class and the abnormal class.

Figure 3:
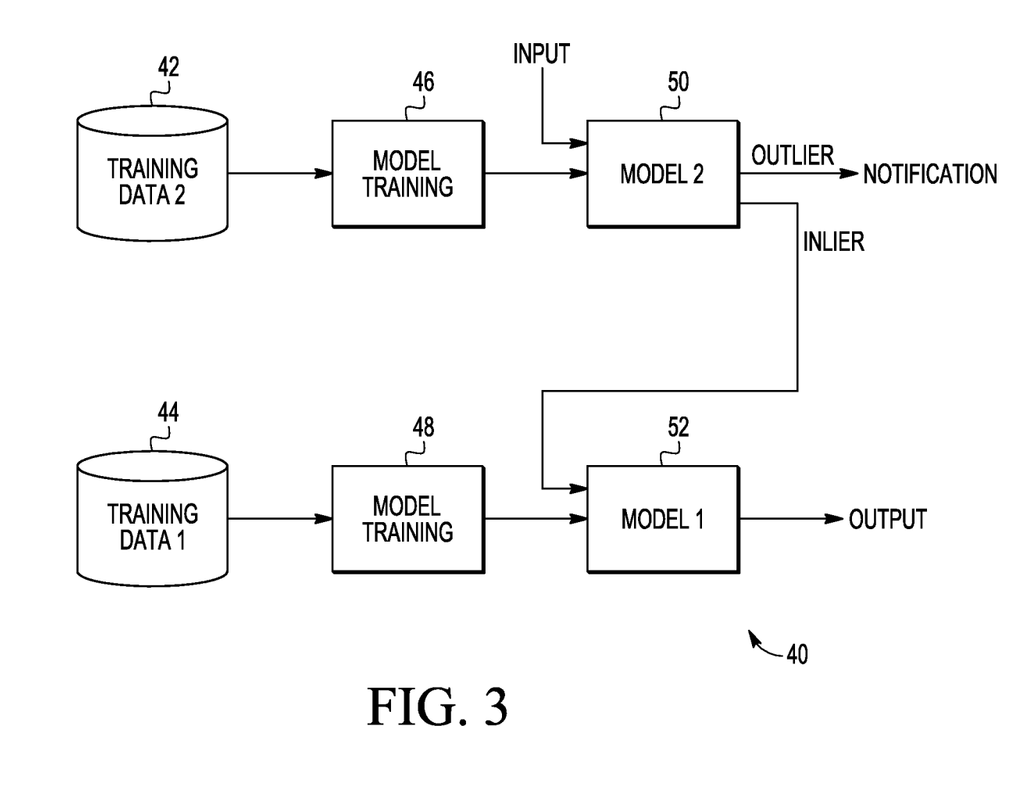
FIG. 3 illustrates a conceptual machine learning system in accordance with another embodiment.

FIG. 3 illustrates a conceptual machine learning system 40 in accordance with another embodiment. Machine learning system 40 includes training data 42 and 44, model training blocks 46 and 48, and trained models 50 and 52. Like the embodiments of FIG. 1 and FIG. 2, machine learning system 40 is characterized as being MLaaS or implemented in a black box where only inputs and outputs of the model are available to an attacker.

In addition to performing a normal machine learning task, the embodiment of FIG. 3 determines if an input sample is classed as an "inlier" or an "outlier." Generally, the normal input samples of a training dataset belong to a distribution of input samples, and all the normal input samples may be referred to as "inliers". The training data samples of training data 44 are characterized as being inliers because they fall within a predetermined distribution and are normal training samples used for training model 52 to perform a particular task. The abnormal input samples do not come from the same distribution as normal input samples and may be referred to as "outliers". After being trained, model 50 determines if an input sample is an inlier and outlier. An outlier input sample may have been provided by an attacker in an attempt to extract the model.

In machine learning system 40, during a model training phase, machine learning model 50 is trained using training data 42 by model training block 46. Machine learning system 40 uses two separately trained machine learning models. Training data 42 and model training block 46 together train machine learning model 50 to make an inlier/outlier prediction regarding an input sample (INPUT). To make the inlier/outlier prediction, various classifiers may be used such as the softmax classifier activation function or the single-class support vector machine (SVM) classifier function. Also, during the model training phase, training data 44 and model training block 48 together train machine learning model 50 to perform a normal prediction regarding an input sample. After both models are trained, machine learning system 40 can be used to predict the output corresponding to a particular input sample. During an inference operating phase, an input sample INPUT is provided to machine learning model 50. Machine learning model 50 makes a prediction about whether or not the input sample is an inlier or an outlier. If machine learning model 50 predicts the input sample is an outlier (OUTLIER in FIG. 3), then a notification (NOTIFICATION) may be provided so than an action may be taken to protect the model from extraction. The notification can be any type of notification. For example, the notification may be a random output that prevents the adversary from making an accurate compilation of outputs from the model. Also, the notification may be an error notification. In addition, the notification may increment a counter. If a counter value exceeds a predefined threshold, a service provider may elect to restrict use of the model.

If machine learning model 50 determines during inference operation that an input sample is an inlier, then the input sample is within the predetermined distribution and the same input sample is then provided to machine learning model 52 via the line marked INLIER in FIG. 3. Machine learning model 52 then performs a prediction on the input sample and returns it as an output (OUTPUT). Note that the machine learning algorithm 52 can be any type of machine learning algorithm such as a classification algorithm or a regression algorithm. Also, in another embodiment, the described machine learning systems may be implemented using an ensemble of machine learning models. Finally, depending on the model training 46, the same training data can be used to train both model 50 and model 52.

Figure 4:
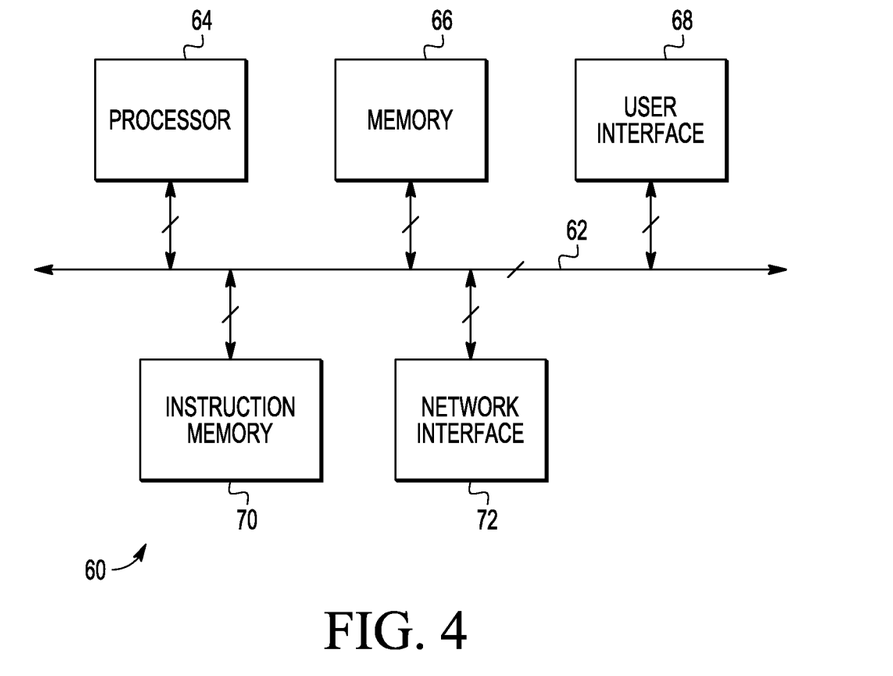
FIG. 4 illustrates a data processing system useful for implementing the machine learning systems of FIGS. 1-3.

FIG. 4 illustrates a data processing system useful for implementing the machine learning systems of FIGS. 1-3. Data processing system 60 may be implemented on one or more integrated circuits and may be used in an implementation of the machine learning systems in accordance with the described embodiments. Data processing system 60 includes bus 62. Connected to bus 62 is processor 64, memory 66, user interface 68, instruction memory 70, and network interface 72. Processor 64 may be any hardware device capable of executing instructions stored in memory 66 or instruction memory 70. For example, processor 64 may execute the machine learning algorithms using training data stored in memory 66. Processor 64 may have multiple processing cores. Processor 64 may be, for example, a microprocessor, field programmable gate array (FPGA), application-specific integrated circuit (ASIC), or similar device. Processor 64 may be implemented in a secure hardware element and may be tamper resistant.

Memory 66 may be any kind of memory, such as for example, L1, L2, or L3 cache or system memory. Memory 66 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. In one embodiment, memory 66 is used to store the training data.

User interface 68 may be connected to one or more devices for enabling communication with a user such as an administrator. For example, user interface 68 may be enabled for coupling to a display, a mouse, a keyboard, or other input/output device. Network interface 72 may include one or more devices for enabling communication with other hardware devices. For example, network interface 72 may include, or be coupled to, a network interface card (NIC) configured to communicate according to the Ethernet protocol. Also, network interface 72 may implement a TCP/IP stack for communication according to the TCP/IP protocols. Various other hardware or configurations for communicating are available.

Instruction memory 70 may include one or more machine-readable storage media for storing instructions for execution by processor 64. In other embodiments, both memories 66 and 70 may also store data upon which processor 64 may operate. Memories 66 and 70 may store, for example, one or more machine learning models, training data, or encryption, decryption, and verification applications. Memory 70 may be implemented in a secure hardware element and be tamper resistant.

By training the machine learning model according to the described embodiments, attacks designed to extract the model can be detected, and steps to prevent the extraction can be initiated.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a machine learning model from extraction, the method comprising:
   during a training phase of operation, training the machine learning model using normal training data, the normal training data for training the machine learning model to perform a predetermined task;
   during the training phase of operation, training the machine learning model using abnormal training data, the abnormal training data for training the machine learning model to identify an attempted extraction of the machine learning model;
   determining, during an inference phase of operation of the machine learning model, if an input sample is input to extract the machine learning model or if the input sample is input for performance of the predetermined task;
   if the input sample is determined by the model to be the attempted extraction, the machine learning model outputting a notification, and
   if the input sample is determined by the model to be related to the predetermined task, the machine learning model predicting a property of the input sample.

2. The method of claim 1, wherein determining if the input sample was input to extract the machine learning model further comprises determining if the input sample is within a predetermined distribution, and wherein if the input sample is outside of the predetermined distribution, the notification is output.

3. The method of claim 1, wherein the machine learning model is characterized as being an ensemble of machine learning models and further comprises a first machine learning model and a second machine learning model, the method further comprising:
   during the training phase of operation, training the first machine learning model using the normal training data and training the second machine learning model using the abnormal training data;
   during the inference phase, providing the input sample to the second machine learning model, if the input sample is determined to be within a predetermined distribution, providing the input sample for further computation by the first machine learning model, and if the input sample is outside the predetermined distribution, providing a notification.

4. The method of claim 1, further comprising providing a confidence level with the notification.

5. The method of claim 1, wherein the notification comprises one of a randomly generated output value or an error notification.

6. The method of claim 1, wherein the machine learning model is provided as a service and stored remotely from a user.

7. A method comprising:
   providing a machine learning system having a first machine learning model and a second machine learning model,
   during a training phase of operation of the machine learning system, training the first machine learning model using normal training data, the normal training data for training the machine learning model to perform a predetermined task;
   during the training phase of operation, training the second machine learning model using abnormal training data, the abnormal training data for training the machine learning model to identify an attempted extraction of the machine learning model;
   determining, during an inference phase of operation of the machine learning system, if an input sample inputted to the second machine learning model is inputted to extract the first machine learning model or if the input sample is inputted for performance of the predetermined task;
   if the input sample is determined by the model to be inputted for the attempted extraction, the machine learning model outputting a notification, and
   if the input sample is determined by the model to be related to the predetermined task, the machine learning model predicting a property of the input sample.

8. The method of claim 7, wherein determining if the input sample was inputted to attempt extraction of the first machine learning model further comprises determining if the input sample is inside or outside of a predetermined distribution, and wherein if the input sample is determined to be outside of the predetermined distribution, the notification is output.

9. The method of claim 7, further comprising providing a confidence level with the notification.

10. The method of claim 7, wherein the notification comprises one of a randomly generated output value or an error notification.

11. The method of claim 7, wherein the machine learning model is provided as a service and stored remotely from a user.

12. The method of claim 7, wherein the second machine learning model is characterized as being a neural network having a softmax activation function.

* * * * *